US012657411B2

(12) United States Patent
Momose et al.

(10) Patent No.: US 12,657,411 B2
(45) Date of Patent: Jun. 16, 2026

(54) CARD POSITIONING METHOD AND CARD READER

(71) Applicant: NIDEC INSTRUMENTS CORPORATION, Nagano (JP)

(72) Inventors: Munemasa Momose, Nagano (JP); Yasuhiro Kitazawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 19/111,790

(22) PCT Filed: Sep. 8, 2023

(86) PCT No.: PCT/JP2023/032878
§ 371 (c)(1),
(2) Date: Mar. 14, 2025

(87) PCT Pub. No.: WO2024/058069
PCT Pub. Date: Mar. 21, 2024

(65) Prior Publication Data
US 2026/0093936 A1    Apr. 2, 2026

(30) Foreign Application Priority Data

Sep. 15, 2022    (JP) ................................. 2022-147327

(51) Int. Cl.
*G06K 7/10*          (2006.01)
(52) U.S. Cl.
CPC ................................ *G06K 7/10118* (2013.01)

(58) Field of Classification Search
CPC .. G06K 7/10118; G06K 7/10; G06K 7/10128;
G06K 7/00; G06K 7/1038
(Continued)

(56) References Cited

U.S. PATENT DOCUMENTS 6,338,048 B1 * 1/2002 Mori .................... G06Q 20/105
705/41
8,851,377 B2 10/2014 Akahane
(Continued)

FOREIGN PATENT DOCUMENTS

JP        2002342723 A   * 11/2002
JP        2005-173947 A     6/2005
(Continued)

OTHER PUBLICATIONS

International Search Report in PCT/JP2023/032878, mailed Nov. 21, 2023. 4pp.

*Primary Examiner* — Edwyn Labaze
(74) *Attorney, Agent, or Firm* — HAUPTMAN HAM, LLP

(57)    ABSTRACT
A card reader includes an IC contact block in electrical contact with a communication terminal of an IC card, and a plurality of sensors which are optical sensors provided in a conveyance path. When the IC card is positioned relative to the IC contact block, the card reader executes a first conveyance step for conveying the IC card inserted into an insertion opening to a farthest side of the conveyance path and a second conveyance step for reversing a conveyance direction after the first conveyance step, then further conveying the IC card by a predetermined distance when the first sensor detects an end portion of the IC card on an insertion opening side, and stopping conveying the IC card.

16 Claims, 3 Drawing Sheets

(58) Field of Classification Search
USPC .................................. 235/451, 439, 435, 375
See application file for complete search history.

(56) References Cited

U.S. PATENT DOCUMENTS

|  |  |  |  |  |
|---|---|---|---|---|
| 9,708,125 | B2 | 7/2017 | Yamamiya |  |
| 11,710,004 | B2 * | 7/2023 | Kageyama ............ | G07F 7/0873 |
|  |  |  |  | 235/439 |
| 2020/0082132 | A1 * | 3/2020 | Kitazawa ............. | G06K 7/0004 |

FOREIGN PATENT DOCUMENTS

| JP | 2009-110280 | A | 5/2009 |
|---|---|---|---|
| JP | 2009-199272 | A | 9/2009 |
| JP | 2017-204309 | A | 11/2017 |

* cited by examiner

FIG. 3A

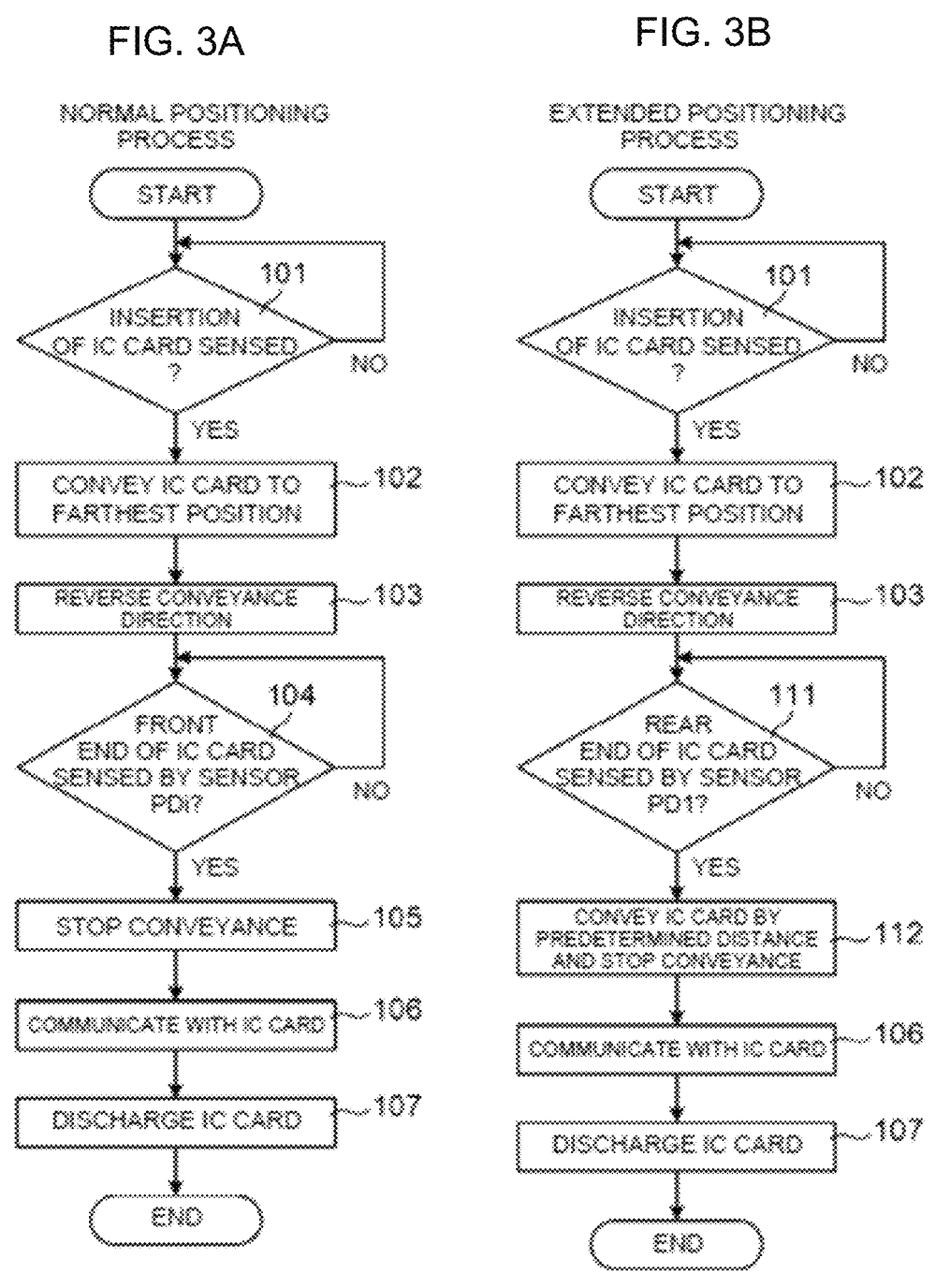

NORMAL POSITIONING
PROCESS

START

INSERTION
OF IC CARD SENSED
? — 101
NO

YES

CONVEY IC CARD TO
FARTHEST POSITION — 102

REVERSE CONVEYANCE
DIRECTION — 103

FRONT
END OF IC CARD
SENSED BY SENSOR
PD1? — 104
NO

YES

STOP CONVEYANCE — 105

COMMUNICATE WITH IC CARD — 106

DISCHARGE IC CARD — 107

END

FIG. 3B

EXTENDED POSITIONING
PROCESS

START

INSERTION
OF IC CARD SENSED
? — 101
NO

YES

CONVEY IC CARD TO
FARTHEST POSITION — 102

REVERSE CONVEYANCE
DIRECTION — 103

REAR
END OF IC CARD
SENSED BY SENSOR
PD1? — 111
NO

YES

CONVEY IC CARD BY
PREDETERMINED DISTANCE
AND STOP CONVEYANCE — 112

COMMUNICATE WITH IC CARD — 106

DISCHARGE IC CARD — 107

END

CARD POSITIONING METHOD AND CARD READER

RELATED APPLICATIONS

The present application is National stage of application No. PCT/JP2023/032878, filed on Sep. 8, 2023, and claims priority based on Japanese Patent Application No. 2022-147327, filed Sep. 15, 2022.

TECHNICAL FIELD

The present invention relates to a card positioning method in a card reader that conveys a card by a motor, and relates to a card reader by which such a positioning method is implemented.

BACKGROUND ART

An IC card with a built-in IC chip is widely used for a credit card and the like. In the card reader that reads and writes data to the IC card, to communicate with the IC card, it is necessary to establish an electrical connection between the card reader and the IC card by bringing an IC contact block on a card reader side into contact with a communication terminal (contact) exposed on a surface of the IC chip. The IC contact block is provided with a contact pin corresponding to the terminal on an IC chip side. In a motor-type card reader into which the IC card is inserted into an inside of the card reader by motor drive, when the IC card is inserted into an insertion opening of the card reader during a time when the IC card is conveyed along a conveyance path in the card reader, it is necessary to move the IC card to a position of the IC contact block on a card reader side and stop the IC card at a correct position. Thus, the card reader is provided with a sensor that detects the position of the IC card along the conveyance path. For such a sensor, an optical sensor that detects a light path blocked by the IC card is widely used. If the optical sensor is used as a sensor that detects the position of the IC card, by detecting not only whether the IC card is present at a sensor position, but also a change in an output state of the sensor, it is possible to detect whether an end portion of the IC card passes the position of the sensor. It is noted that the IC card is often provided with a magnetic stripe to be used also as a magnetic card.

An external dimension of the IC card, a position of the communication terminal and a position of the magnetic stripe in the IC card are determined according to a standard such as the ISO standard. In recent years, to improve a design of the IC card, a part of the IC card may be formed of a transparent material (or a material having a light-transmitting property) without changing an external dimension of the IC card. In reading and writing data from and to the IC card having a transparent or light-transmitting portion by using a motor-type card reader, the optical sensor may not be able to detect an exact position of the IC card inside the card reader due to a presence of a transparent (light-transmitting) portion, and thus, in such cases, the IC contact block of the card reader cannot contact the communication terminal on the IC card side, and as a result, a communication between the card reader and the IC card may be impossible.

In a technology for detecting a card including a transparent portion, regardless of whether an IC chip is included, Patent Literature 1 discloses a technology in which a contact-type card detection sensor is provided along a conveyance path in a card reader to detect a card including a transparent portion. The contact-type card detection sensor includes, for example, a card sensing member that is biased to protrude into the conveyance path and is displaced when pressed by a card, a light blocking plate attached to the card sensing member, and an optical sensor having a light path being blocked by a light blocking plate that moves in response to the displacement of the card sensing member. Patent Literatures 2 and 3 disclose a technology for sensing a position of a card by using a sensing unit including a roller displaced by contact with a card being conveyed, and an optical sensor that senses the displacement of the roller. In a card including a magnetic stripe, regardless of whether an IC chip is provided, a magnetic stripe portion is not a portion having transparency or translucency, and thus, Patent Literature 4 discloses a technology in which the optical sensor is provided at a position where a magnetic stripe portion passes when the card is moved.

Patent Literature 5 discloses a technology in which to enable a normal card process even for an IC card having a damaged or transparent portion, whether a sensor senses the card while a motor conveys the card is monitored, when the sensor senses the card, a timer is started from that moment to count a time period during which the card is conveyed, and by the time the conveyance time reaches a predetermined value, the conveyance of the card is stopped and the IC contact block on the card reader is brought into contact with the communication terminal of the IC card.

CITATION LIST

Patent Literature

[Patent Literature 1] Japanese Patent Application Publication No. 2009-199272

[Patent Literature 2] Japanese Patent Application Publication No. 2016-115091

[Patent Literature 3] Japanese Patent Application Publication No. 2017-204309

[Patent Literature 4] Japanese Patent Application Publication No. 2005-173947

[Patent Literature 5] Japanese Patent Application Publication No. 2009-110280

SUMMARY OF THE INVENTION

Problems to be Solved by the Invention

If the technologies disclosed in Patent Literatures 1 to 3 are applied, it is possible to detect the exact position of the IC card having a transparent or light-transmitting portion, and it is also possible to reliably bring the IC contact block of the card reader into contact with the communication terminal on the IC card side, however, contact type sensors used in such technologies have problem in that as a result of the light being blocked by the card, it is more expensive than an optical sensor that detects the card, and the position where the sensor is placed within the card reader is restricted. The technology described in Patent Literature 4 also requires the provision of an additional optical sensor in addition to the sensor already provided in the card reader to position the IC card within the card reader, resulting in increased costs. The technology described in Patent Literature 5 involves measuring the conveyance time period by sensing the card with the sensor, however, Patent Literature 5 does not particularly describe how the card including the transparent portion is accurately sensed by the sensor.

An object of the present invention is to provide, in a card reader in which an IC card is conveyed by a motor in a conveyance path, a card positioning method for accurately positioning a communication terminal of the IC card on an IC contact block on a card reader side even if an IC card has a transparent or light-transmitting area, and a card reader for implementing such a card positioning method.

Means for Solving the Problem

According to one aspect of the present invention, there is provided a card positioning method in a card reader that reads at least data from an IC card including a communication terminal, the card reader including a conveyance path including an insertion opening at one end through which the IC card is inserted from a front end of the IC card, a conveyance roller provided along the conveyance path, the conveyance roller conveying the IC card, a motor that drives the conveyance roller, an IC contact block in electrical contact with a communication terminal of the IC card, a plurality of sensors provided in the conveyance path along a conveyance direction of the IC card, the plurality of sensors detecting the IC card, in which each of the plurality of sensors is an optical sensor that detects that an optical path is blocked by the IC card being conveyed, and a first sensor of the plurality of sensors is provided along the conveyance path at a position that is on one end side of the conveyance path from an IC contact block, the card positioning method comprising executing an extended positioning process including when a position of the IC card in the conveyance path, the position allowing the communication terminal to be electrically contacted with the IC contact block, is defined as a communication position, in positioning the IC card with respect to the communication position in the conveyance path, a first conveyance step for conveying the IC card inserted into the insertion opening along the conveyance path toward an alternate end of the conveyance path, and a second conveyance step for reversing the conveyance direction of the IC card after the first conveyance step, then further conveying the IC card by a predetermined distance when the first sensor detects a rear end of the IC card, and stopping conveying the IC card.

In the card positioning method according to one aspect, the rear end (end portion on an insertion opening side) of the IC card is detected by the first sensor, thereafter, the IC card is conveyed by a predetermined distance and then positioned at the communication position, and thus, even if there is a case where although a sensor that directly senses that the IC card is at the communication position is provided, such a sensor cannot properly detect the IC card due to a presence of a transparent areas in the IC card, it is possible to accurately position the IC card at the communication position.

In the card positioning method according to one aspect, if the IC card includes a non-light-transmitting area formed to extend from the front end to the rear end of the IC card along the conveyance direction of the IC card, the first sensor is preferably provided in the conveyance path at a position corresponding to the non-light-transmitting area. An example of the non-light-transmitting area formed to extend from the front end to the rear end of an IC card includes a magnetic stripe provided on the IC card. When the first sensor is placed to correspond to such a non-light-transmitting area if the non-light-transmitting area is provided in the IC card, it is possible to accurately detect the rear end of the IC card by the first sensor, and thus, it is easier to accurately position the IC card at the communication position.

4

In the card positioning method according to one aspect, the second sensor out of the plurality of sensors is provided at a position that is on a side of the alternate end of the conveyance path relative to the first sensor, the position corresponding to the front end of the IC card at the communication position, for example. Such a second sensor is used to determine whether the IC card is at the communication position in an existing general card reader. Therefore, the card positioning method according to the aspect is used in the existing general card reader. In such a case, when the IC card is positioned with respect to the communication position within the conveyance path, either the extended positioning process or the normal positioning process may be selected and executed. The normal positioning process is a process performed in the existing general card reader, and includes the above-described first conveyance step, and a third conveyance step for reversing a convey direction of the IC card after the first conveyance step, and thereafter stopping conveying the IC card when the second sensor detects the front end of the IC card. When the control unit may select between the extended positioning process and the normal positioning process, it is possible to select and execute the existing normal positioning process to the IC card known not to include the transparent area, and it is possible to reduce an amount of calculation generated along with the process. Further, based on a transition pattern of outputs of the plurality of sensors when the first conveyance step is being performed, either the extended positioning process or the normal positioning process may be selected. When such a selection is performed, it is possible to optimize a process of positioning the IC card at the communication position for even an IC card including a transparent area and an IC card not including a transparent area.

A card reader according to one aspect of the present invention is a card reader that reads at least data from an IC card including a communication terminal, the card reader including a conveyance path including an insertion opening at one end through which the IC card is inserted from a front end of the IC card, a conveyance roller provided along the conveyance path, the conveyance roller conveying the IC card, a motor that drives the conveyance roller, an IC contact block in electrical contact with a communication terminal of the IC card, a plurality of sensors provided in the conveyance path along a conveyance direction of the IC card, the plurality of sensors detecting the IC card, and a control unit that controls a motor, based on outputs of the plurality of sensors, in which each of the plurality of sensors is an optical sensor that detects that an optical path is blocked by the IC card being conveyed, a first sensor of the plurality of sensors is provided along the conveyance path at a position that is on one end side of the conveyance path from an IC contact block, and when a position of the IC card in the conveyance path, the position allowing the communication terminal to be electrically contacted with the IC contact block, is defined as a communication position, the control unit controls the motor to execute an extended positioning process including a first conveyance step for conveying the IC card inserted into the insertion opening along the conveyance path toward an alternate end of the conveyance path, and a second conveyance step for reversing a conveyance direction of the IC card after the first conveyance step, then further conveying the IC card by a predetermined distance when the first sensor detects a rear end of the IC card, and stopping conveying the IC card, to position the IC card at the communication position within the conveyance path.

In the card reader according to one aspect, the control unit conveys the IC card by a predetermined distance after detecting the rear end of the IC card by the first sensor to position the IC card at the communication position. As a result, even in a case where although a sensor that directly senses that the IC card is at the communication position is provided, such a sensor cannot properly detect the IC card due to a presence of a transparent areas in the IC card, it is possible to accurately position the IC card at the communication position.

In the card reader according to one aspect, if the IC card includes a non-light-transmitting area, such as a magnetic stripe, formed to extend from the front end to the rear end of the IC card along the conveyance direction of the IC card, the first sensor is preferably provided in the conveyance path at a position corresponding to the non-light-transmitting area. When the first sensor is placed to correspond to such a non-light-transmitting area if the non-light-transmitting area is provided in the IC card, it is possible to accurately detect the rear end of the IC card by the first sensor, and thus, it is easier to accurately position the IC card at the communication position.

In the card reader according to one aspect, the second sensor out of the plurality of sensors is provided at a position that is on a side of the alternate end of the conveyance path relative to the first sensor, the position corresponding to the front end of the IC card at the communication position, for example. Such a second sensor is used to determine whether the IC card is at the communication position in a general card reader. Therefore, when the extended positioning process is added to the process executed by the control unit, it is possible to employ the existing general card reader for the card reader according to the present aspect. In such a case, when the IC card is positioned at the communication position within the conveyance path, the control unit may select and execute either the extended positioning process or the normal positioning process. When the control unit may select between the extended positioning process and the normal positioning process, it is possible to select and execute the existing normal positioning process to the IC card known not to include the transparent area, and it is possible to reduce an amount of calculation generated along with the process. Further, based on a transition pattern of outputs of the plurality of sensors when the first conveyance step is being performed, the control unit may select either the extended positioning process or the normal positioning process. When such a selection is performed, it is possible to optimize a process of positioning the IC card at the communication position for even an IC card including a transparent area and an IC card not including a transparent area.

Effect of the Innovation

According to the present invention, in a card reader that conveys an IC card by a motor in a conveyance path, it is possible to accurately position a communication terminal of the IC card to an IC contact block on a card reader side even in a case of the IC card provided with a transparent or light-transmitting area.

BRIEF DESCRIPTION OF THE DRAWINGS

FIGS. 3A and 3B are flowcharts describing a control of a conveyance of the IC card.

MODE FOR CARRYING OUT THE INVENTION

Figures 1A, 1B, 1C, 1D:
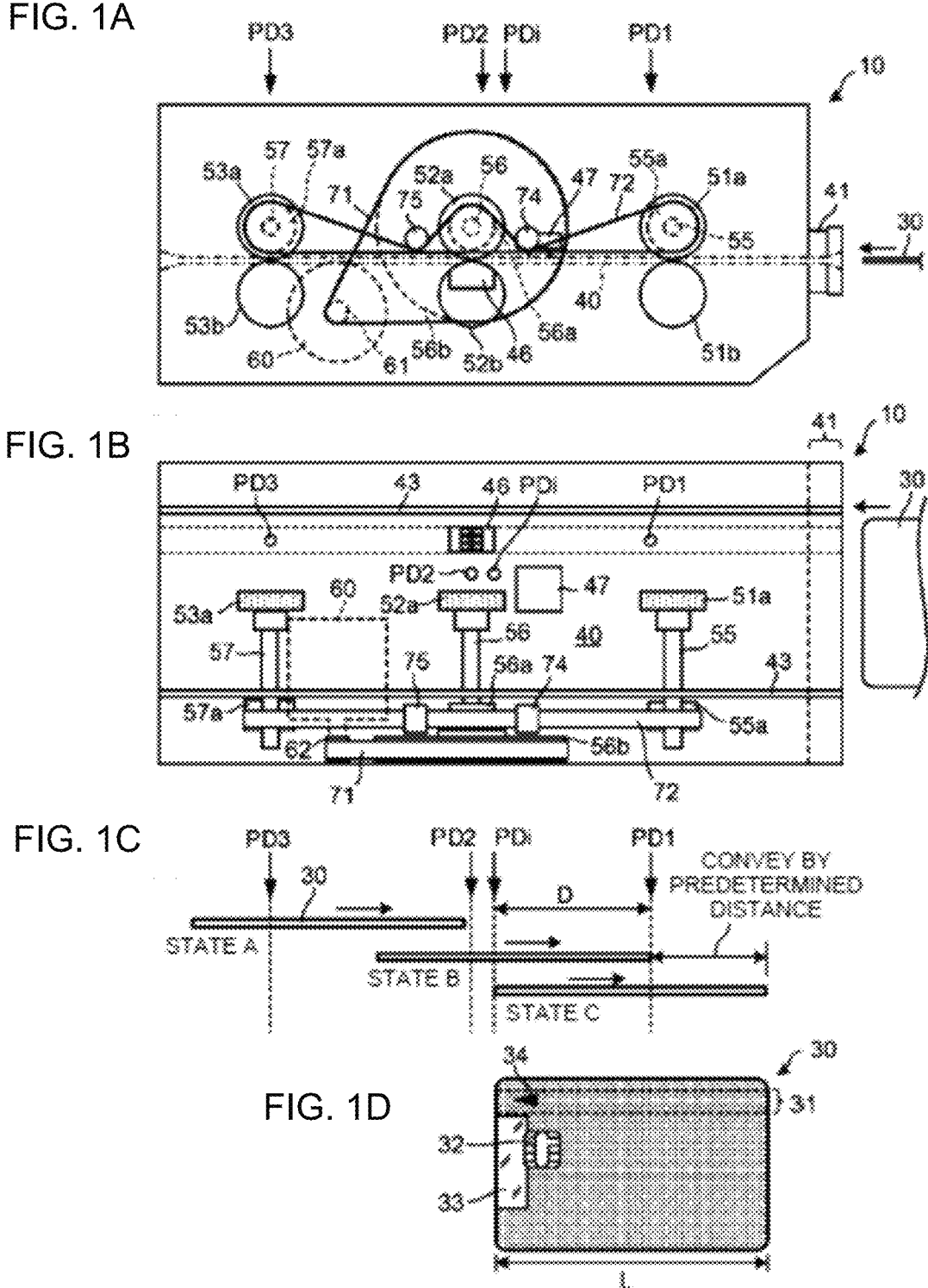
FIGS. 1A and 1B are respectively a side cross-sectional view and a plan cross-sectional view illustrating a card reader according to one embodiment of the present invention.
FIG. 1C is a schematic diagram illustrating a conveyance process of an IC card.
FIG. 1D is a plan view illustrating an example of the IC card.

Next, a preferred embodiment of the present invention will be described with reference to the drawings. FIGS. 1A to 1D are diagrams describing a card reader according to one embodiment of the present invention, in which FIG. 1A, FIG. 1B are respectively a side cross-sectional view and a plan cross-sectional view, FIG. 1C is a schematic side view illustrating a conveyance process of an IC card in an extended positioning process, and FIG. 1D is a plan view illustrating an example of the IC card. An IC card 30 to be processed by a card reader 10 according to the present embodiment is formed in a roughly rectangular plate shape, is a typical card complying with the ISO standard and the like, includes, for example, a magnetic stripe 31, and includes, at a position defined according to the standard, a communication terminal 32 that electrically connects to a built-in IC chip. The IC card 30 is also provided with a light-transmitting area 33 which is transparent or allows light to transmit. Both the magnetic stripe 31 and the communication terminal 32 are opaque, and thus, the light-transmitting area 33 is set to an area excluding an area where the magnetic stripe 31 is formed and an area where the communication terminal 32 is formed. A surface of the IC card 30 is printed with an insertion direction indication mark 34 indicating an insertion direction when the IC card 30 is inserted into the card reader 10. The card reader 10 according to the present embodiment is mounted and used on a higher-level device 15 (see FIG. 2) such as Automated Teller Machine (ATM).

First, the card reader 10 will be described. The card reader 10 communicates with the IC card 30 including an IC chip therein, and reads at least data from the IC card 30. In the card reader 10, a longitudinal direction of the IC card 30 corresponds to a conveyance direction of the IC card 30. The card reader 10 is provided with a linear conveyance path 40 along which the IC card 30 is conveyed such that the conveyance path 40 extends in a front-rear direction of the card reader 10. An insertion opening 41 is formed at one end of the conveyance path 40, and when the card reader 10 is mounted on the higher-level device 15 such as an ATM, a user may insert the IC card 30 into the card reader 10 from outside the higher-level device 15 through the insertion opening 41. The insertion opening 41 is provided with a card detection switch (not illustrated) that detects the IC card 30 inserted. In FIGS. 1A and 1B, an insertion direction of the IC card 30 when the IC card 30 is inserted into the card reader 10 through the insertion opening 41 is indicated by an arrow.

Both sides of the conveyance path 40 are formed with a pair of guide portions 43, which are side plates, and a distance between the guide portions 43 defines a passage width of the conveyance path 40. The passage width is equal to or slightly larger than a width of the IC card 30. In the following description, a near side of the card reader 10 refers to a side of the insertion opening 41 on the conveyance path 40, and a far side of the card reader 10 refers to an opposite side of the insertion opening 41. With respect to the IC card 30, a front end means an end portion on the far side of the card reader 10 when inserted into the card reader 10, and a rear end means an end portion on the near side of the card reader 10. Therefore, when the IC card 30 is inserted into the card reader 10, the front end side of the IC card 30 is firstly inserted into the card reader 10. A width direction of the IC card 30 means a direction perpendicular to both the conveyance direction of the IC card 30 and a thickness direction of the IC card 30 in the card reader 10.

The conveyance path 40 is provided with three pairs of conveyance rollers along the conveyance direction of the IC card 30 at approximately a center of the conveyance path 40 in a passage width direction. The conveyance rollers closest to the insertion opening 41 include a driving roller 51*a* provided on a top surface side of the conveyance path 40 and a driven roller 51*b* provided on a bottom surface side of the conveyance path 40, and the conveyance rollers farthest from the insertion opening 41 include a driving roller 53*a* provided on the top surface side of the conveyance path 40 and a driven roller 53*b* provided on the bottom surface side of the conveyance path 40. The conveyance rollers provided at an approximately middle position between such conveyance rollers include a driving roller 52*a* provided on the upper surface side of the conveyance path 40 and a driven roller 52*b* provided on the lower surface side of the conveyance path 40. Each of the conveyance rollers has a function of sandwiching and forwarding the IC card 30 by the driving rollers 51*a*, 52*a*, and 53*a* and the driven rollers 51*b*, 52*b*, and 53*b*. The driving rollers 51*a*, 52*a*, and 53*a* rotate by a driving force of a motor 60 as described below, and the driven rollers 51*b*, 52*b*, and 53*b* rotate following a rotation of the driving rollers 51*a*, 52*a*, and 53*a* or following a sliding of the IC card 30 moved by the rotation of the driving rollers 51*a*, 52*a*, and 53*a*. On the lower surface side of the conveyance path 40, a magnetic head 46 is provided at a position corresponding to a position of the magnetic stripe 31 in the IC card 30. On a top surface side of the conveyance path 40, an IC contact block 47 is provided at a position corresponding to a position of the communication terminal 32 of the IC card 30.

To detect the position of the IC card 30 on the conveyance path 40, four sensors PD1, PD2, PD3, and PDi are provided along the conveyance path 40. The sensor PD1 is provided at a position on the near side of the conveyance path 40, and the position corresponds to the magnetic stripe 31 of the IC card 30. In the illustrated example, when considered along the conveyance direction of the IC card 30, the sensor PD1 is provided slightly on the far side of the position of the driving roller 51*a*. The sensor PD 3 is provided at a position on the far side of the conveyance path 40, and the position corresponds to the magnetic stripe 31 of the IC card 30. In the illustrated example, when considered along the conveyance direction of the IC card 30, the sensor PD3 is located approximately at the position of the driving roller 53*a*. The sensor PD2 is provided at a position approximately midway between the sensors PD1 and PD3. The magnetic head 46 is provided at such a position, and thus, it is not possible to provide the sensor PD2 at the position corresponding to a position of the magnetic stripe 31 of the IC card 30, and as a result, the sensor PD2 is provided at a position shifted toward a center in the width direction of the IC card 30. In the illustrated example, when considered along the conveyance direction of the IC card 30, the sensor PD2 is located approximately at the position of the driving roller 52*a*. The sensor PDi is provided slightly on the near side from the sensor PD2. Even such a position interferes with the magnetic head 46, and thus, the sensor PDi is provided at a position shifted toward the center in the width direction of the IC card 30 from the position corresponding to the magnetic stripe 31 of the IC card 30. When the position of the IC card 30 within the conveyance path 40, the position at which the communication terminal 32 is brought into electrical contact with the IC contact block 47, is defined as the communication position, the sensor PDi is disposed to detect the front end of the IC card 30 by the sensor PDi when the IC card 30 is at the communication position. A distance D between the sensor PDi and the sensor PD1 along the conveyance direction of the IC card 30 is shorter than a length L of the IC card 30, that is, a distance between the front end and the rear end of the IC card 30. The sensors PD1, PD2, PD3, and PDi are configured by an optical sensor capable of detecting the IC card 30 when a light path is blocked by the IC card 30.

Power transmission members that transmit a driving force of the motor 60 to the driving rollers 51*a*, 52*a*, and 53*a* include toothed belts 71 and 72. An output of the motor 60 is first transmitted to a large diameter gear portion 56*b*, which is a gear portion provided on a shaft body 56 supporting the driving roller 52*a*, via a gear 61 attached to a rotation shaft of the motor 60 and the toothed belt 71. The shaft body 56 is provided also with a small diameter gear portion 56*a*, which is a gear portion having a smaller diameter than the large diameter gear portion 56*b*, and the small diameter gear portion 56*a* rotates in conjunction with a rotation of the large diameter gear portion 56*b*. The shaft body 55 supporting the driving roller 51*a* and a shaft body 57 supporting the driving roller 53*a* are provided with gear portions 55*a* and 57*a*, respectively. The small diameter gear portion 56*a* of the shaft body 56 of the driving roller 52*a* and the gear portions 55*a* and 57*a* of the shaft bodies 55 and 57 of the driving roller 51*a* and the driving roller 53*a* are connected by the toothed belt 72, and rotate in conjunction with each other. Tensioners 74 and 75 of the toothed belt 72 are arranged before and after the driving roller 52*a*, and as a result, a constant tension is applied to the toothed belt 72. After all, in the card reader 10, the driving rollers 51*a*, 52*a*, and 53*a* are all driven by the single motor 60. Here, there are three sets of combination of the conveyance rollers, that is, the driving roller and the driven roller, provided in the card reader 10, however, the number of conveyance rollers is not limited to three sets, and there may be two sets or less or four sets or more. It is noted that the driven rollers 51*b*, 52*b*, and 53*b* on the bottom surface side of the conveyance path 40 are hidden by the driving rollers 51*a*, 52*a*, and 53*a* on the top surface side of the conveyance path 40, and thus, the driven rollers 51*b*, 52*b*, and 53*b* are not illustrated in FIG. 1B.

Figure 2:
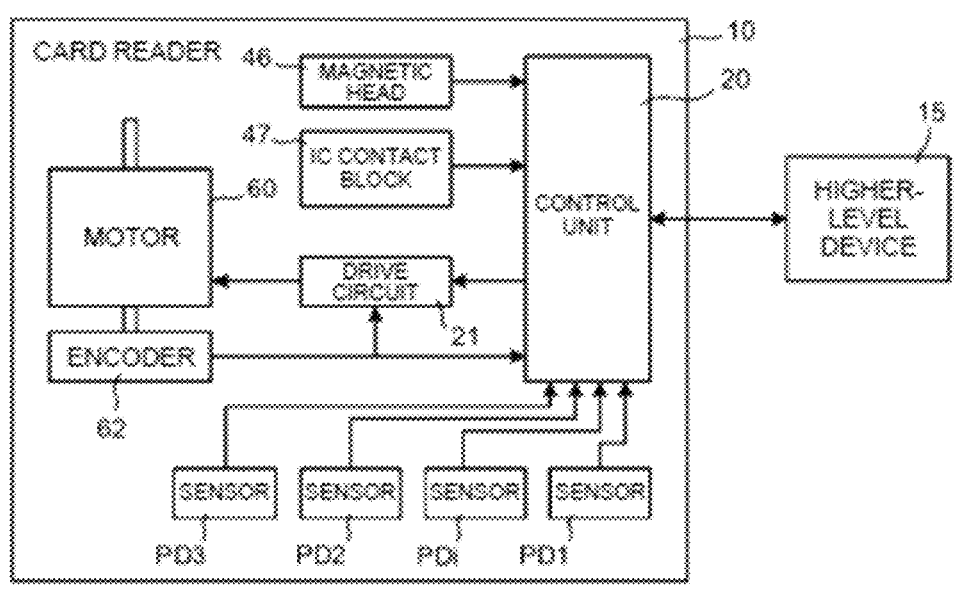
FIG. 2 is a block diagram illustrating a configuration of the card reader.

FIG. 2 is a block diagram illustrating a functional configuration of the card reader 10 serving as an electronic device. A control unit 20 that controls an overall operation of the card reader 10 is provided, and the control unit 20 is capable of communicating with the higher-level device 15 such as an ATM in which the card reader 10 is mounted. The control unit 20 is configured, for example, by a microcomputer or a microprocessor, and operates according to a software. The sensors PD1, PD2, PD3, and PDi, the magnetic head 46, and the IC contact block 47 are also connected to the control unit 20. Configuration is such that the IC contact block 47 is normally located above the conveyance path 40, but is pushed toward the conveyance path 40 side by a solenoid (not illustrated) controlled by the control unit 20, and is electrically contacted with the communication terminal 32 of the IC card 30 to perform a communication via the communication terminal 32. The motor 60 is provided with an encoder 62 connected to a rotation shaft of the motor 60, and a rotational position of the motor 60 can be detected by the encoder 62. The motor 60 is a direct current (DC) motor, and is controlled by the control unit 20 via a drive circuit 21. The control unit 20 outputs a position command and a current command (or a torque command) for the motor 60 to the drive circuit 21, and the drive circuit 21 drives the motor 60 by a servo control, based on the command from the control unit 20. For the servo control, rotational position information of the motor 60 is input from the encoder 62 to the drive circuit 21. The rotational position information of the motor 60 is also input to the control unit 20 from the encoder 62.

In such a card reader 10, the control unit 20 controls the drive of the motor 60 in response to the command from the higher-level device 15 to load and eject the IC card 30 into the card reader 10, and also reads and writes data from and to the card IC 30 located on the conveyance path 40. When the magnetic head 46 reads and writes data from and to the magnetic stripe 31 of the IC card 30, or when the IC contact block 47 reads and writes data via the communication terminal 32 of the IC card 30, it is necessary to control so that the IC card 30 is conveyed at an appropriate speed within the conveyance path 40 and so that the IC card 30 is stopped at an appropriate position, that is, the above-described communication position. A control program operated in the control unit 20 includes a routine to control the motor 60, based on detection results in the sensors PD1, PD2, PD3, and PDi, and to control the conveyance of the IC card 30. The card reader 10 according to the present embodiment is equivalent to a general card reader that reads and writes data to and from the IC card 30 provided also in the magnetic stripe 31, regarding an arrangement of the magnetic head 46, the IC contact block 47, and the sensors PD1, PD2, PD3, and PDi.

FIGS. 3A and 3B are flowcharts illustrating a process executed by the control unit 20 to control the conveyance of the IC card 30. In a case of a general IC card 30 not including the light-transmitting area 33, it is possible to reliably control the front end of the IC card 30 by the sensor PDi. In such a case, the IC card 30 can be conveyed according to the normal positioning process illustrated in FIG. 3A so that the communication terminals 32 of the IC card 30 can be reliably positioned on the IC contact block 47 on a card reader 10 side. In the normal positioning process, in step 101, the control unit 20 monitors an output of a card detection switch (not illustrated) provided in the insertion opening 41, and waits until an insertion of the IC card 30 into the insertion opening 41 is sensed. When an insertion of the IC card 30 is sensed, in step 102, the control unit 20 controls the motor 68 to take the IC card 30 into the card reader 10 and conveys the IC card 30 along the conveyance path 40 to a farthest position on the far side, and then, in step 103, reverses the conveyance direction and starts conveying the IC card 30 toward the near side. The control unit 20 monitors the output of the sensor PDi, and waits until the sensor PDi detects the front end of the IC card 30 in step 104. The IC card 30 continues to move to the near side until the front end of the IC card 30 is detected.

When the front end of the IC card 30 is sensed in step 104, the control unit 20 immediately stops the conveyance of the IC card 30 in step 105. In such a state, the IC card 30 is positioned at the communication position, with the communication terminals 32 of the IC card 30 facing directly the IC contact block 47 of the card reader 10. In step 106, the control unit 20 brings the IC contact block 47 into contact with the communication terminal 32 to start a communication with the IC card 30. When the communication with the IC card 30 is completed, in step 107, the control unit 20 retreats the IC contact block 47 toward above the conveyance path 40, drives the motor 68 to convey the IC card 30 further toward the insertion opening 41 to discharge the IC card 30 from the insertion opening 41. As a result, the conveyance of the IC card 30 through the normal positioning process is ended. Such a normal positioning process is also executed by the control unit even in the existing general card reader.

In a case of the general IC card 30 not including the light-transmitting area 33, when the front end of the IC card 30 is detected by the sensor PDi, by the above-described normal positioning process, it is possible to accurately position the IC card 30 to be at the communication position within the conveyance path 40. However, if the light-transmitting area 33 is present in the IC card 30 as illustrated in FIG. 1D, it is not possible to accurately detect the front end of the IC card 30 by the sensor PDi, and as a result, the position of the communication terminal 32 is shifted from the position corresponding to the IC contact block 47, and the communication with the IC card 30 may not be possible in the card reader 10. In the card reader 10 according to the present embodiment, to accurately position the IC card 30 including the light-transmitting area 33 relative to the IC contact block 47, the extended positioning process is set as a control of the conveyance of the IC card 30. Both the normal positioning process and the extended positioning process are realized by the control unit 20 executing a software program.

FIG. 3B illustrates the extended positioning process. In the extended positioning process, the control unit 20 first directly executes the process from step 101 to step 103 in the normal positioning process. When the conveyance direction is reversed in step 103, the control unit 20 monitors the output of the sensor PD1, and in step 111, the control unit 20 waits until the rear end of the IC card 30 is detected by the sensor PD1. The sensor PD1 is provided in the conveyance path 40 of the card reader 10 corresponding to the formation area of the magnetic stripe 31, which is an area of the IC card 30 that cannot serve as the light-transmitting area 33, and thus, the front end of the IC card 30 is surely detected by the sensor PD1. The IC card 30 continues to move to the near side until the rear end of the IC card 30 is detected.

The distance D between the sensor PD1 and the sensor PDi along the conveyance direction of the IC card 30 is shorter than the length L of the IC card 30, and at the time when the sensor PD1 detects the rear end of the IC card 30, the front end of the IC card 30 is located on the far side from the position of the sensor PDi. Therefore, when the control unit 20 detects the rear end of the IC card 30 in step 111, in step 112, the control unit 20 conveys the IC card 30 by a predetermined distance toward the insertion opening 41 and stops conveying the IC card 30. Here, the predetermined distance is equal to a distance obtained by subtracting the distance D from the length L, and when the IC card 30 is conveyed by the predetermined distance, the front end of the IC card 30 moves to the position of the sensor PDi. In such a state, the IC card 30 is at the communication position, as in the normal positioning process. Therefore, the control unit 20 executes the process of steps 106 and 107 described in the above-mentioned normal positioning process. As a result, the conveyance of the IC card 30 through the extended positioning process is ended.

FIG. 1C schematically illustrates a process of conveying the IC card 30 in the extended positioning process. A state A in FIG. 1C indicates the position of the IC card 30 in the card reader 10 when the conveyance direction of the IC card 30 is reversed in step 103. A state B indicates a state in which a rear edge of the IC card 30 is detected by the sensor PD1 in step 111, and a state C indicates a state in which the IC card 30 is conveyed by a predetermined distance in step 112 and is at the communication position.

In the card reader 10 according to the present embodiment, to communicate with the IC card 30 and read at least data from the IC card 30, either the normal positioning process or the extended positioning process is executed. Which process is to be performed can be specified by a command sent from the higher-level device 15 to the control unit 20. For example, when the higher-level device 15 is for a specific client and it is known that the light-transmitting area 33 is not provided in the IC card 30 issued by the client, it is possible to send the command to the control unit 20 from the higher-level device 15 to perform the normal positioning process. Conversely, when it is known that the light-transmitting area 33 is provided in the IC card 30 issued by the client, it is possible to send the command to the control unit 20 from the higher-level device 15 to perform the extended positioning process. Further, the higher-level device 15 may be configured to transmit the command to perform the extended positioning process to the control unit 20 when receiving a notification of a read-out failure from the control unit 20 after transmitting the command to perform the normal positioning process to the control unit 20. Further, the process from the start to step 102 is common to the normal positioning process and the extended positioning process, and thus, the control unit 20 may monitor a detection result of the sensors PD1, PD2, PD3, and PDi when the IC card 30 is conveyed to a farthest side in step S102 and analyses a transition of the detection result from each sensor, and when the same transition pattern as a transition pattern assumed in the IC card 30 not including the light-transmitting area 33 is obtained, execute the normal positioning process, and when a different transition pattern is obtained, execute the extended positioning process, on the card reader 10 side.

According to the card reader 10 of the present embodiment described above, it is possible to use an inexpensive optical sensor with a simple configuration as the sensors PD1, PD2, PD3, and PDi that detect the position of the IC card 30, and it is possible to accurately position the IC card 30 including a transparent area or a light-transmitting area at the position of the IC contact block 47, and thus, it is possible to normally read and write data to and from the IC card 30.

The invention claimed is:

1. A card positioning method in a card reader that reads at least data from an IC card including a communication terminal, the card reader comprising:
a conveyance path including an insertion opening at one end through which the IC card is inserted from a front end of the IC card; a conveyance roller provided along the conveyance path, the conveyance roller conveying the IC card; a motor that drives the conveyance roller; an IC contact block in electrical contact with the communication terminal of the IC card; and a plurality of sensors provided in the conveyance path along a conveyance direction of the IC card, the plurality of sensors detecting the IC card, wherein
each of the plurality of sensors is an optical sensor that detects that an optical path is blocked by the IC card being conveyed, and
a first sensor of the plurality of sensors is provided along the conveyance path at a position that is on a side of the one end of the conveyance path relative to the IC contact block, the card positioning method comprising executing an extended positioning process including:

when a position of the IC card in the conveyance path, the position allowing the communication terminal to be electrically contacted with the IC contact block, is defined as a communication position, in positioning the IC card with respect to the communication position in the conveyance path,
a first conveyance step for conveying the IC card inserted into the insertion opening along the conveyance path toward an alternate end of the conveyance path; and
a second conveyance step for reversing the conveyance direction of the IC card after the first conveyance step, then further conveying the IC card by a predetermined distance when the first sensor detects a rear end of the IC card, and stopping conveying the IC card.

2. The card positioning method according to claim 1, wherein the IC card includes a non-light-transmitting area formed to extend from the front end to the rear end of the IC card along the conveyance direction of the IC card, and
the first sensor is provided in the conveyance path at a position corresponding to the non-light-transmitting area.

3. The card positioning method according to claim 2, wherein a second sensor out of the plurality of sensors is provided at a position that is on a side of the alternate end of the conveyance path relative to the first sensor, the position corresponding to the front end of the IC card at the communication position.

4. The card positioning method according to claim 3, wherein when the IC card is positioned with respect to the communication position in the conveyance path, either the extended positioning process or a normal positioning process is selected and executed, and
the normal positioning process comprises:
the first conveyance step; and
a third conveyance step for reversing the conveyance direction of the IC card after the first conveyance step, and thereafter stopping conveying the IC card when the second sensor detects the front end of the IC card.

5. The card positioning method according to claim 4, wherein either the extended positioning process or the normal positioning process is selected, based on a transition pattern of an output of each of the plurality of sensors when the first conveyance step is implemented.

6. The card positioning method according to claim 1- or 2, wherein a second sensor out of the plurality of sensors is provided at a position that is on a side of the alternate end of the conveyance path relative to the first sensor, the position corresponding to the front end of the IC card present at the communication position.

7. The card positioning method according to claim 6, wherein when the IC card is positioned with respect to the communication position in the conveyance path, either the extended positioning process or a normal positioning process is selected and executed, and
the normal positioning process comprises:
the first conveyance step; and
a third conveyance step for reversing the conveyance direction of the IC card after the first conveyance step, and thereafter stopping conveying the IC card when the second sensor detects the front end of the IC card.

8. The card positioning method according to claim 7, wherein either the extended positioning process or the normal positioning process is selected, based on a transition pattern of an output of each of the plurality of sensors when the first conveyance step is implemented.

9. A card reader for reading at least data from an IC card including a communication terminal, comprising:

a conveyance path including an insertion opening at one end through which the IC card is inserted from a front end of the IC card;

a conveyance roller provided along the conveyance path, the conveyance roller conveying the IC card;

a motor that drives the conveyance roller;

an IC contact block that electrically contacts the communication terminal of the IC card;

a plurality of sensors provided in the conveyance path along a conveyance direction of the IC card, the plurality of sensors detecting the IC card; and a control unit that controls the motor, based on outputs of the plurality of sensors, wherein each of the plurality of sensors is an optical sensor that detects that an optical path is blocked by the IC card being conveyed, a first sensor of the plurality of sensors is provided along the conveyance path at a position that is on a side of the one end of the conveyance path relative to the IC contact block, and when a position of the IC card in the conveyance path, the position allowing the communication terminal to be electrically contacted with the IC contact block, is defined as a communication position, the control unit controls the motor to execute an extended positioning process including: a first conveyance step for conveying the IC card inserted into the insertion opening along the conveyance path toward an alternate end of the conveyance path; and a second conveyance step for reversing the conveyance direction of the IC card after the first conveyance step, then further conveying the IC card by a predetermined distance when the first sensor detects a rear end of the IC card, and stopping conveying the IC card, to position the IC card at the communication position within the conveyance path.

10. The card reader according to claim 9, wherein the IC card includes a non-light-transmitting area formed to extend from the front end to the rear end of the IC card along the conveyance direction of the IC card, and the first sensor is provided in the conveyance path at a position corresponding to the non-light-transmitting area.

11. The card reader according to claim 10, wherein a second sensor out of the plurality of sensors is provided at a position on a side of the alternate end of the conveyance path relative to the first sensor, the position corresponding to the front end of the IC card at the communication position.

12. The card reader according to claim 11, wherein when the IC card is positioned with respect to the communication position in the conveyance path, the control unit selects and executes either the extended positioning process or a normal positioning process, and the normal positioning process comprises:

the first conveyance step; and a third conveyance step for reversing the conveyance direction of the IC card after the first conveyance step, and thereafter stopping conveying the IC card when the second sensor detects the front end of the IC card.

13. The card reader according to claim 12, wherein the control unit selects and executes either the extended positioning process or the normal positioning process, based on a transition pattern of an output of each of the plurality of sensors when the first conveyance step is implemented.

14. The card reader according to claim 9, wherein a second sensor out of the plurality of sensors is provided at a position that is on a side of the alternate end of the conveyance path relative to the first sensor, the position corresponding to the front end of the IC card at the communication position.

15. The card reader according to claim 14, wherein when the IC card is positioned with respect to the communication position in the conveyance path, the control unit selects and executes either the extended positioning process or a normal positioning process, and the normal positioning process comprises:

the first conveyance step; and a third conveyance step for reversing the conveyance direction of the IC card after the first conveyance step, and thereafter stopping conveying the IC card when the second sensor detects the front end of the IC card.

16. The card reader according to claim 15, wherein the control unit selects and executes either the extended positioning process or the normal positioning process, based on a transition pattern of an output of each of the plurality of sensors when the first conveyance step is implemented.

* * * * *